Sept. 29, 1936.   G. A. WALLACE   2,055,512
SLUICE GATE SEAL
Filed Feb. 25, 1935

INVENTOR
Galen G. Wallace
Frank W. Halliday
ATTORNEY

Patented Sept. 29, 1936

2,055,512

UNITED STATES PATENT OFFICE 2,055,512

SLUICE GATE SEAL

Galen A. Wallace, Zanesville, Ohio

Application February 25, 1935, Serial No. 8,049

2 Claims. (Cl. 251—167)

(Granted under the act of March 3, 1883, as amended April 30, 1928; 370 O. G. 757)

This invention described herein may be manufactured and used by or for the Government for governmental purposes without the payment to me of any royalty thereon.

This invention relates generally to a sluice gate seal adapted to be used in controlling the flow from the outlets of dams or other fluid passages, but more particularly to an especially designed seal providing an uninterrupted floor for contact with the edge of sluice gates or similar apparatus.

Sluice gates are usually constructed so as to require a recess in the floor of the outlet channel in order to obtain a seal on the bottom face of the gate. This construction is objectionable as the bottom seal strip on the gate frame is subject to rapid wear and stones or other objects lodge in the recess and prevent the closing of the gate. An alternate construction which eliminates the recess at the bottom of the gate is the use of a wood strip or a babbitt filled casting imbedded in the floor of the opening against which the bottom of the gate abuts to form a seal. These seals are unsatisfactory as they require a large downward force on the gate to make the seal tight. This force progressively distorts the seal with each closure thus causing the rapid destruction of the seal and the constantly further lowering of the gate to obtain a tight seal.

It is to overcome these and other objectionable features of the devices that have been previously used, to obtain a bottom seal for hydraulic gates, that the novel construction set forth in the following description was designed.

The principal object of the invention is to provide a durable seal which holds with uniform tightness throughout its entire length and one which will not deteriorate or lose its effectiveness over a long period of time.

Another object of the invention is to provide a seal which does not require a recess in the outlet channel floor, and one which is not permanently deformed by gate closure, but on the contrary resumes its original shape on removal of the gate pressure, a feature which obviates the necessity of excessive strain on the operating mechanism to obtain a tight seal because of the resiliency of the sealing element.

A further object of the invention is that it provides a seal that is durable, efficient, economical and benefitted by frequent use, and one which is easily replaced.

Other objects of the invention consists of certain novel details of construction and arrangement of parts as hereinafter shown in the drawing, described in the specification and more particularly defined in the accompanying claims.

The preferred embodiment of the invention is illustrated in the accompanying drawing in which.

Figure 1:
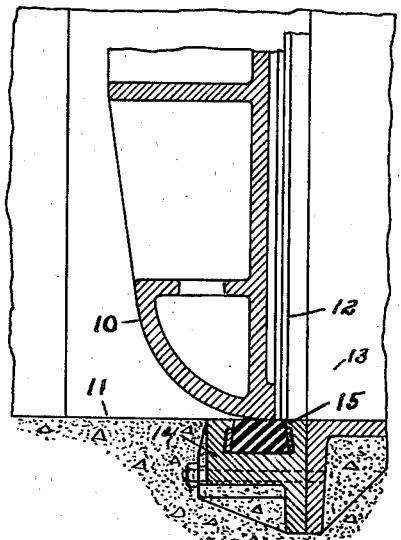
Fig. 1 is a vertical section of a cast sluice gate showing the application of the invention.
Figure 2:
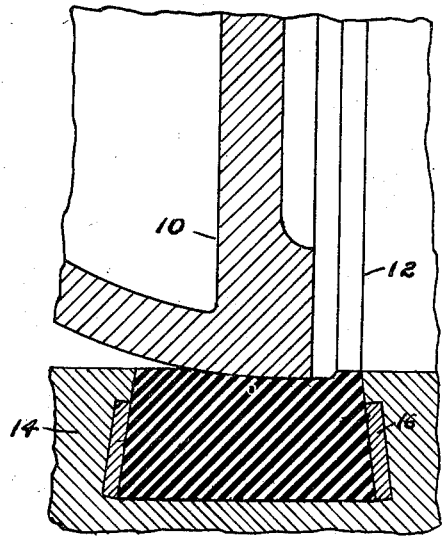
Fig. 2 is an enlarged view showing assembly details.

Referring particularly to Figs. 1 and 2 which show the invention when used in connection with a cast sluice gate, the reference numeral (10) designates this type of gate, installed in a conduit (11) having side walls (13). The sluice gate slides vertically on the side seal plates (12) when the gate is being opened or closed.

Figure 3:
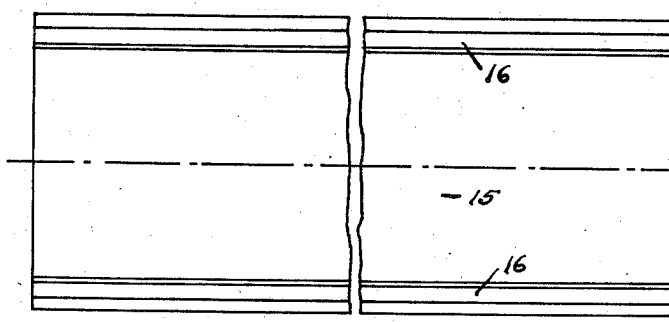
Fig. 3 shows the assembly of the sill and lock plates in plan view.
Figure 5:
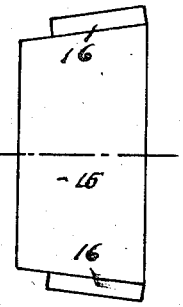
Fig. 5 is an end elevation of the assembly shown in Figs. 3 and 4.
Figure 4:
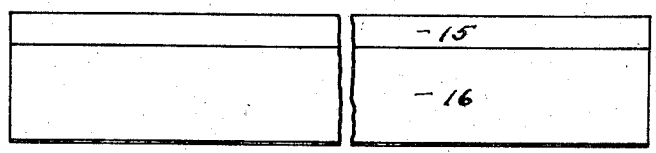
Fig. 4 is a side elevation of the assembly shown in Fig. 3.

The seal comprises a rubber strip made up of one or more sections forming a sill (15) which is preferably bonded by vulcanization to metal lock plates (16). This assembly, shown in Fig. 3, is of proper dimensions to fit the size of the gate leaf and is inserted in the bottom seal casting (14), which has been machined to the proper dimensions to receive it.

The metal lock plates (16) extend throughout the length of the sill and are preferably formed of a width which is less than the height of the sill so that the casing (14) encloses all surfaces of the sill and plate assembly except the upper or contact surface of the sill.

This invention is readily adaptable to any type of gate capable of using a butt type of bottom seal. It can be used on a vertical lift or sector type of head gate of any length by using a plurality of seal elements. It can also be used as a bottom seal on the roller and three chord type of gates used on navigation projects.

It will, of course, be understood that the detail manner in which the seal element is mounted is dependent on the type of gate with which it is used, and that a considerable variation in mounting is possible without any material departure from the essential features of the invention.

Having described my invention, what I claim as new and wish to secure by Letters Patent is:

1. A sluice gate seal comprising, a casing provided with a flat upper surface, a longitudinal channel in said upper surface having a trapezoidal cross-section, the base thereof being larger than the channel opening in the upper surface of said casing, and the sloping side walls thereof, each being provided with a longitudinal rectangular groove with its lower edge adjacent the base of said channel and its upper edge lying below the channel opening; an elongated elastic sill having a cross-sectional contour identical to said channel; longitudinal rectangular lock plates bonded by vulcanization to the side walls of said sill and adapted to fit snugly within the grooves of said channel to provide for the retention of the sill.

2. A sluice gate seal comprising, a casing having a flat upper surface, a longitudinal channel in said upper surface having a trapezoidal cross-section, the base thereof being larger than the channel opening in the upper surface of said casing, and the sloping side walls thereof, each being provided with a longitudinal rectangular groove with its lower edge adjacent the base of said channel and its upper edge lying below the channel opening; a sill composed of a plurality of elastic blocks having a cross-sectional contour identical to said channel; longitudinal rectangular lock plates bonded to the side walls of said elastic blocks and adapted to fit snugly within the grooves of said channel for retention of the blocks within the casing.

GALEN A. WALLACE.